UNITED STATES PATENT OFFICE.

JOHN A. FROBERG, OF CHICAGO, ILLINOIS.

FRUIT-JUICE AND PROCESS OF PRESERVING SAME.

No. 892,415.   Specification of Letters Patent.   Patented July 7, 1908.

Application filed December 19, 1907. Serial No. 407,232.

*To all whom it may concern:*

Be it known that I, JOHN A. FROBERG, a citizen of the United States, residing at Chicago, county of Cook, and State of Illinois, have discovered a certain new and useful Fruit-Juice and Process of Preserving Same, of which the following is a description.

In the preservation of blackberry juices, as well as other similar fruit juices, the great difficulty is to prevent the fermentation of the liquid, and to overcome this, various methods have been employed, including the use of sufficient alcohol to accomplish the purpose, or of sugar or other similar material in considerable quantities. Other methods have also been employed with more or less success. In all prior methods, however, where the fruit juice is to be used for medicinal or similar purposes, its value is to a greater or less extent impaired by the ingredients employed to preserve it.

The object of my invention is to preserve blackberry and other fruit juices of a similar nature in as near a pure state as possible, preventing deterioration by fermentation by the employment of another juice or extract which is in itself of recognized medicinal value. To this end my invention consists in the novel process hereinafter ser forth and described, and more particularly pointed out in the claims.

I will describe my improved process as applied to the preservation of blackberry juice, for the reason that my discovery was first based upon such use, and also for the reason that much the larger portion of my experiments have been directed along this line.

I find by actual experiment extended over a considerable length of time that blackberry juice varies in its characteristics to a considerable extent, apparently depending upon whether the berries are the first product of the season or of a later crop, and also depending to a considerable extent upon the variety. This is noticeable to some extent in the taste of the fruit juice before it is treated at all.

In preparing the juice, I have in actual use secured satisfactory results by using about four pounds of fresh blackberries to substantially from a half to a full pint of pure water (preferably distilled,) and after thoroughly heating the same, (substantially bringing the same to a boiling point,) carefully squeezing out the juice, and thoroughly straining the same through a cheese-cloth or any other well-known means. These proportions will ordinarily produce substantially one quart of liquid. This liquid may immediately, or at any reasonable time, preferably not exceeding twenty-four hours, be boiled preferably from thirty to fifty minutes, after which it is again carefully strained. When this point is reached I take substantially two ounces of juniper berries, (that is about three per cent. in weight of blackberries) and boil them in substantially a pint of pure water (also preferably distilled) for approximately thirty minutes, that is to say, about the same length of time that the blackberry juice was boiled, to extract the juice, carefully straining the same as before. As thus described, the juniper berry extract should be in bulk substantially one fourth to one third of the blackberry juice. The boiling juniper berry extract is then poured into the blackberry juice, and the liquid bottled and properly corked. When treated in this manner no fermentation followed, nor did any mold or scum appear upon the top of the juice. This was true notwithstanding the fact that the product was rebottled and the cork removed a number of times. The purer the juices of the two ingredients the more satisfactory the results. This product is particularly beneficial for medicinal purposes and if desired may be slightly sweetened or otherwise modified at the time of use.

The medicinal value of the compound may in some cases be improved or broadened by adding one (1) ounce of pure glycerin and one (1) gill of pure plum juice to the mixture described. The plum juice used by me with good results consisted of substantially a gill of pure plum juice containing about two (2) ounces of sugar. By this addition the compound is somewhat sweetened and the taste of the juniper berry extract lessened.

In using blackberries late in the season I find by experiment that owing to the difference in the berries before referred to, a slightly different treatment is preferable. With such berries I secured good results by using substantially four pounds of blackberries with a pint of pure water and boiling the same for about 45 minutes, then carefully straining the liquid through a cheese-cloth or by other suitable means, to separate the juice from the pulp. Two ounces of juniper berries in a pint of water was brought to a boil for about two minutes, after which the boiling blackberry juice was poured thereover, and after carefully straining the mass, the product was reheated as before. The liquid was then carefully bottled and corked as before, and remained in excellent condition without the use of any other preservative.

It will be clear from the description given that the extract of juniper berries prepared substantially in the manner set forth so combines with the blackberry juice as to prevent fermentation, and in all cases is a favorable retardant of such action.

In my experiments I have sought to preserve so far as possible the natural flavor of the blackberries or other fruit juices, and consequently have used the least possible quantity of juniper berry extract for this reason, as otherwise it would unnecessarily flavor or modify the taste of the blackberry juice.

If owing to the exposure of the liquid for a considerable time to the atmosphere, and possibly unfavorable climatic or atmospheric conditions, there is a tendency after some days to develop slight fermentation or possibly the formation of a slight scum or mold on the top, it may be remedied by carefully straining the liquid as before, reheating it and after again carefully straining it, rebottling and corking as before.

Having thus described my invention, what I claim as new and desire to secure by Letters Patent is:—

1. The herein described process of preserving fruit juice consisting in mixing the liquid obtained by boiling substantially four pounds of fruit in one pint of water, with the liquid obtained by boiling two ounces of juniper berries in from one-half to one pint of water, heating the mixture, thoroughly straining the same, and sealing the product.

2. The herein described process of preserving blackberry juice, consisting in mixing the liquid obtained by boiling substantially four pounds of blackberries in one pint of water, with the liquid obtained by boiling two ounces of juniper berries in from one-half to one pint of water, heating the mixture thoroughly, and thoroughly straining the same, and sealing the product.

3. The herein described product comprising fruit and juniper berry juices sterilized, strained and compounded together in substantially the proportions specified.

4. The herein described product, comprising blackberry and juniper berry juices, sterilized, strained, and compounded together in substantially the proportions specified.

In testimony whereof, I have hereunto signed my name in the presence of two subscribing witnesses.

JOHN A. FROBERG

Witnesses:
JOHN W. HILL,
CHARLES I. COBB.